(12) United States Patent
Watanabe (10) Patent No.: US 7,107,083 B2
(45) Date of Patent: Sep. 12, 2006

(54) INPUT DEVICE CONNECTED TO MOBILE COMMUNICATION TERMINAL WITH WHICH CHARACTERS CAN BE INPUT EASILY

(75) Inventor: Kazutoshi Watanabe, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 540 days.

(21) Appl. No.: 10/144,206

(22) Filed: May 10, 2002

(65) Prior Publication Data

US 2002/0173340 A1    Nov. 21, 2002

(30) Foreign Application Priority Data

May 15, 2001    (JP)    ............................. 2001-144072

(51) Int. Cl.
*H04M 1/00*    (2006.01)
*H04B 1/38*    (2006.01)

(52) U.S. Cl. ............................... 455/575.3; 455/556.1; 455/557; 455/575.1; 455/575.4; 455/90.3

(58) Field of Classification Search ............. 455/556.1, 455/557, 566, 575.1, 575.3, 575.4, 90.3
See application file for complete search history.

(56) References Cited

U.S. PATENT DOCUMENTS 5,666,694 A * 9/1997 Slow et al. .................... 16/368
6,147,858 A * 11/2000 Takahashi .................... 361/680
6,370,018 B1 * 4/2002 Miller et al. ................. 361/680
6,385,463 B1 * 5/2002 Lieberman et al. .......... 455/557
6,542,721 B1 * 4/2003 Boesen ...................... 455/553.1
6,671,170 B1 * 12/2003 Webb et al. ................. 361/680
6,888,534 B1 * 5/2005 Northway .................... 345/169

FOREIGN PATENT DOCUMENTS

| JP | 8-126050 | 5/1996 |
| WO | WO 98/19434 | 5/1998 |
| WO | WO 0122695 A1 | 3/2001 |

* cited by examiner

*Primary Examiner*—Nay Maung
*Assistant Examiner*—Wen W. Huang
(74) *Attorney, Agent, or Firm*—Brinks Hofer Gilson & Lione (57) ABSTRACT

An input device includes a supporting unit which is provided with first shafts, and a rotating unit is connected to the first shafts in a rotatable manner. In addition, an operating unit is provided with second shafts, and the rotating unit is also connected to the second shafts in a rotatable manner. When the operating unit is at an operating position, it is closely attached to an input unit provided on the front surface of a mobile phone. When the operating unit is at a stored position, the second shafts of the operating unit is moved from the front side of a mobile phone to the back side thereof, so that the operating unit is closely attached to the back surface of the mobile phone.

39 Claims, 6 Drawing Sheets

INPUT DEVICE CONNECTED TO MOBILE COMMUNICATION TERMINAL WITH WHICH CHARACTERS CAN BE INPUT EASILY

This application claims the benefit of priority to Japanese Patent Application 2001-144072, filed on May 15, 2001.

BACKGROUND OF THE INVENTION

1. Field of the Invention

The present invention relates to an input device which is connected to a mobile communication terminal such as a mobile phone and with which characters can be input easily.

2. Description of the Related Art

In mobile terminals such as mobile phones and personal digital assistants (PDAs), characters are usually input by the following methods. In mobile phones, characters are input by using a numeric keypad (a group of keys including number keys and keys for the four basic operators). Japanese characters, for example, are input in the form of kana characters (Japanese syllabic alphabet, and there are two types: hiragana and katakana) or romaji (writing system based on Roman characters used to represent Japanese text). In PDAs, characters are input by writing each character on a liquid crystal display with a pen-type input device. In addition, keyboard-type input devices with a plurality of keys arranged thereon are sold separately, and are used for inputting characters by connecting them to the mobile terminals.

Figure 6:
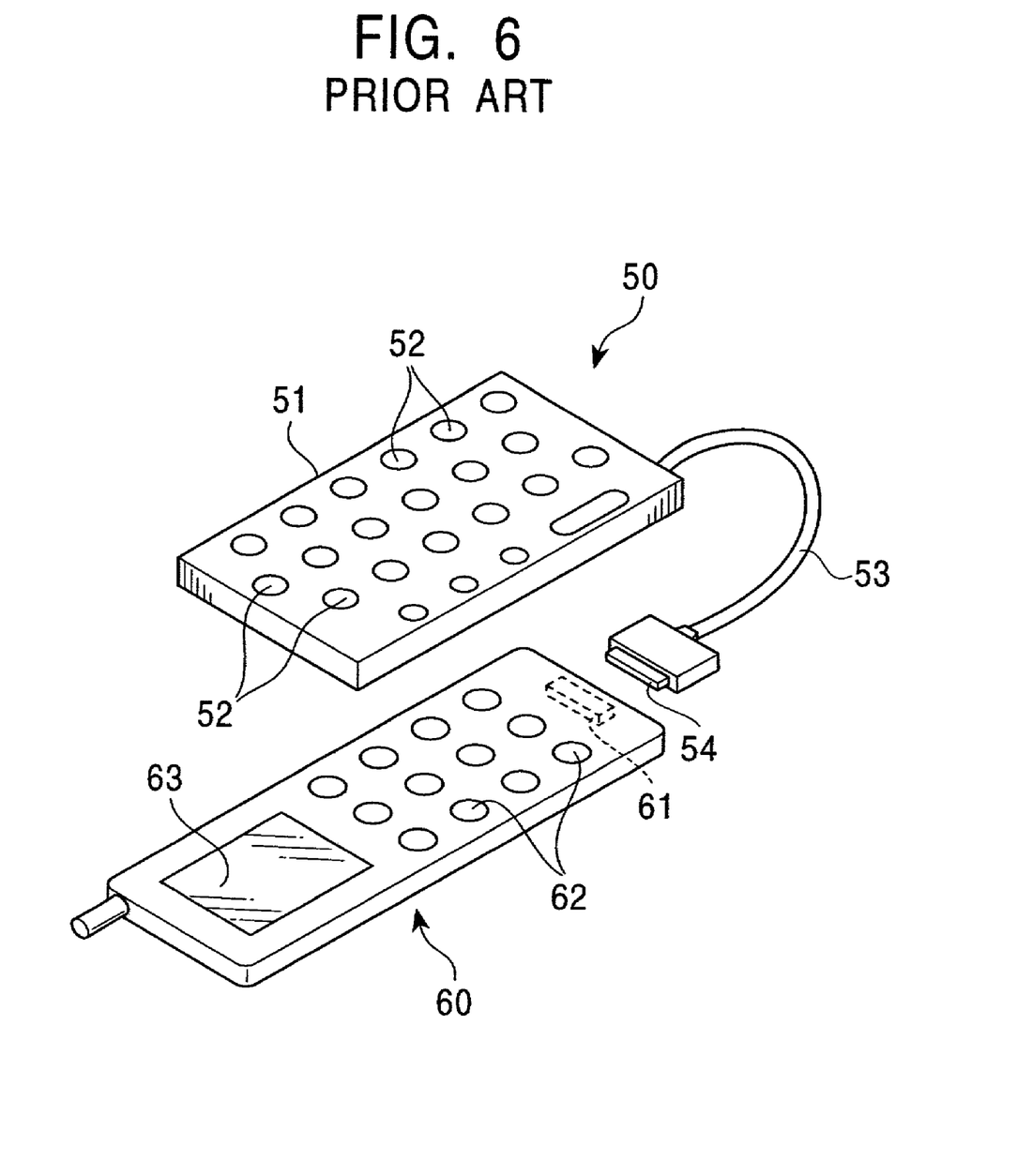
FIG. 6 is a perspective view of a known input device in a state in which the input device is used.

FIG. 6 is a perspective view of a known keyboard-type input device and a mobile terminal to which the keyboard-type input device is connected. With reference to FIG. 6, an input device 50 includes an operating unit 51 provided with a plurality of operation keys 52 and a connecting cable 53 which extends from the operating unit 51. The connecting cable 53 is provided with a connecter 54 at the distal end thereof, and the connecter 54 is attached to a connecting port 61 formed at the bottom end of a mobile terminal 60 in a detachable manner. The mobile terminal 60 includes an input unit 62 and a display unit 63.

In the input device 50, kana characters and romaji can be input by operating the operation keys 52. When the operation keys 52 are pressed, operating data is transmitted to the mobile terminal 60, and character strings are displayed on the display unit 63. Then, the character strings are converted into transmission data, which is transmitted from the mobile terminal 60 to other mobile terminals.

However, mobile terminals of the known art have the following problems.

When characters are input to a mobile phone without an input device connected thereto, a single key must be pressed up to five times in order to input a single hiragana character or katakana character, and a single key must be pressed up to three or four times in order to input a single alphabet character. Therefore, a relatively large input time is required. When characters are input to a PDA without an input device connected thereto, there is a problem in that characters are not recognized reliably. In addition, a large input time is also required in this case.

In the case in which the input device 50 shown in FIG. 6 is used, the operation to connect and disconnect the input device 50 to/from the mobile terminal is cumbersome. In addition, since the input device 50 and the mobile terminal 60 are connected to each other with the connecting cable, the user cannot input characters easily and smoothly while holding both the input device 50 and the mobile terminal 60.

Furthermore, since the input device 50 must be disconnected from the mobile terminal 60 and carried separately when it is not being used, the input device 50 is not carried conveniently.

SUMMARY OF THE INVENTION

In order to solve the above-described problems, an object of the present invention is to provide an input device with which characters can be input quickly and reliably and which can be carried conveniently.

An input device of according to the present invention includes a supporting unit including a connector which is detachably connected to a mobile terminal having a display unit; an operating unit which transmits an operation signal to the mobile terminal via the connector; a plurality of operation keys provided on an operating surface of the operating unit; and a position converting unit which is formed between the supporting unit and the operating unit, and which, while the connector is connected to the mobile terminal, allows the operating unit to rotate between a stored position at which the operating unit is hidden behind the mobile terminal and an operating position at which the operating surface is exposed at a position such that the operating surface can be operated.

Preferably, when the operating unit is at the operating position, the operating unit is disposed on the front surface of the mobile terminal in such a manner that the operating surface faces upward.

An input unit may be provided on the front surface of the mobile terminal in addition to the display unit and the operating unit is disposed on the input unit when the operating unit is at the operating position. It becomes possible to operate the input unit of the mobile terminal when the operating unit is at the stored position, and it becomes possible to operate the operation keys of the operating unit when the operating unit is at the operating position.

The connecter may be connected to a connecting port provided at the bottom-end surface of the mobile terminal, and the position converting unit may include a rotating unit which is connected to the supporting unit by first shafts in a rotatable manner, the first shafts extending parallel to the bottom-end surface, and the operating unit may be supported by second shafts in a rotatable manner at a base end portion of the operating unit, the second shafts extending parallel to the first shafts. When the rotating unit is rotated in one direction, the second shafts are moved to the front side of the mobile terminal and the operating unit is moved to the operating position at which the operating unit is closely attached to the front surface of the mobile terminal, and when the rotating unit is rotated in the other direction, the second shafts are moved to the back side of the mobile terminal and the operating unit is moved to the stored position at which the operating unit is closely attached to the back surface of the mobile terminal.

The position converting unit may be constructed such that the operating unit is connected to the supporting unit in a rotatable manner by a shaft which extends perpendicular to the back surface of the mobile terminal, and the operating unit may be moved between the stored position at which the operating unit is disposed behind the back surface of the mobile terminal and the operating position at which the operating surface is exposed at a side of the mobile terminal by rotating the operating unit around the shaft.

According to the above-described input device of the present invention, characters can be input quickly and reliably compared with the cases in which characters are input by using a pen-type input device or a keyboard as in the known art. In addition, since the input device of the present invention can be reliably attached to the mobile terminal without causing the operating unit to rattle, the input operation can be easily performed. Furthermore, since the input device does not become cumbersome when it is attached to the mobile terminal, the mobile terminal can be conveniently carried and handled without causing discomfort to the user.

DESCRIPTION OF THE PREFERRED EMBODIMENTS

Figure 1:
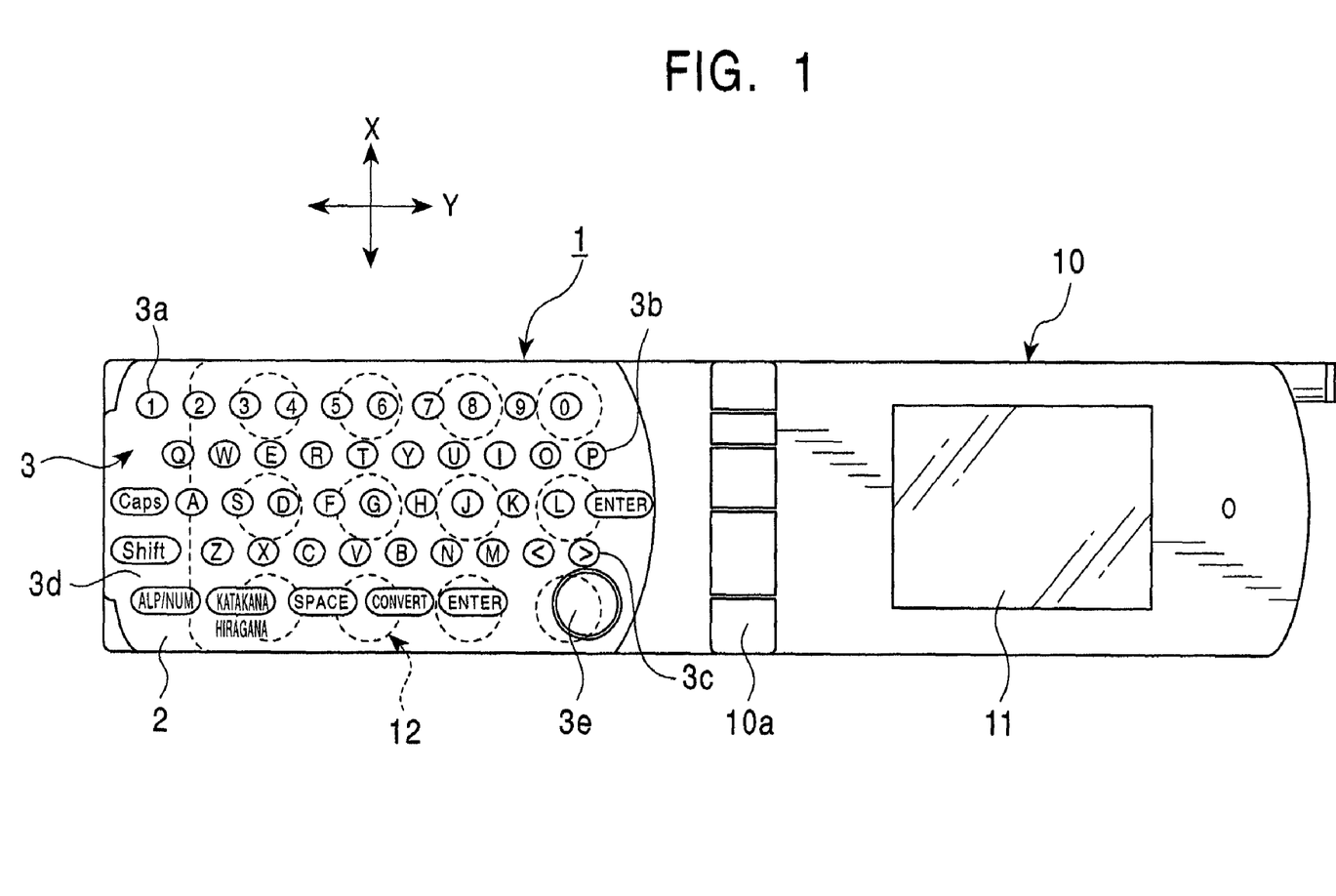
FIG. 1 is a plan view of an input device according to a first embodiment of the present invention in a state in which the input device is used.
Figure 2:
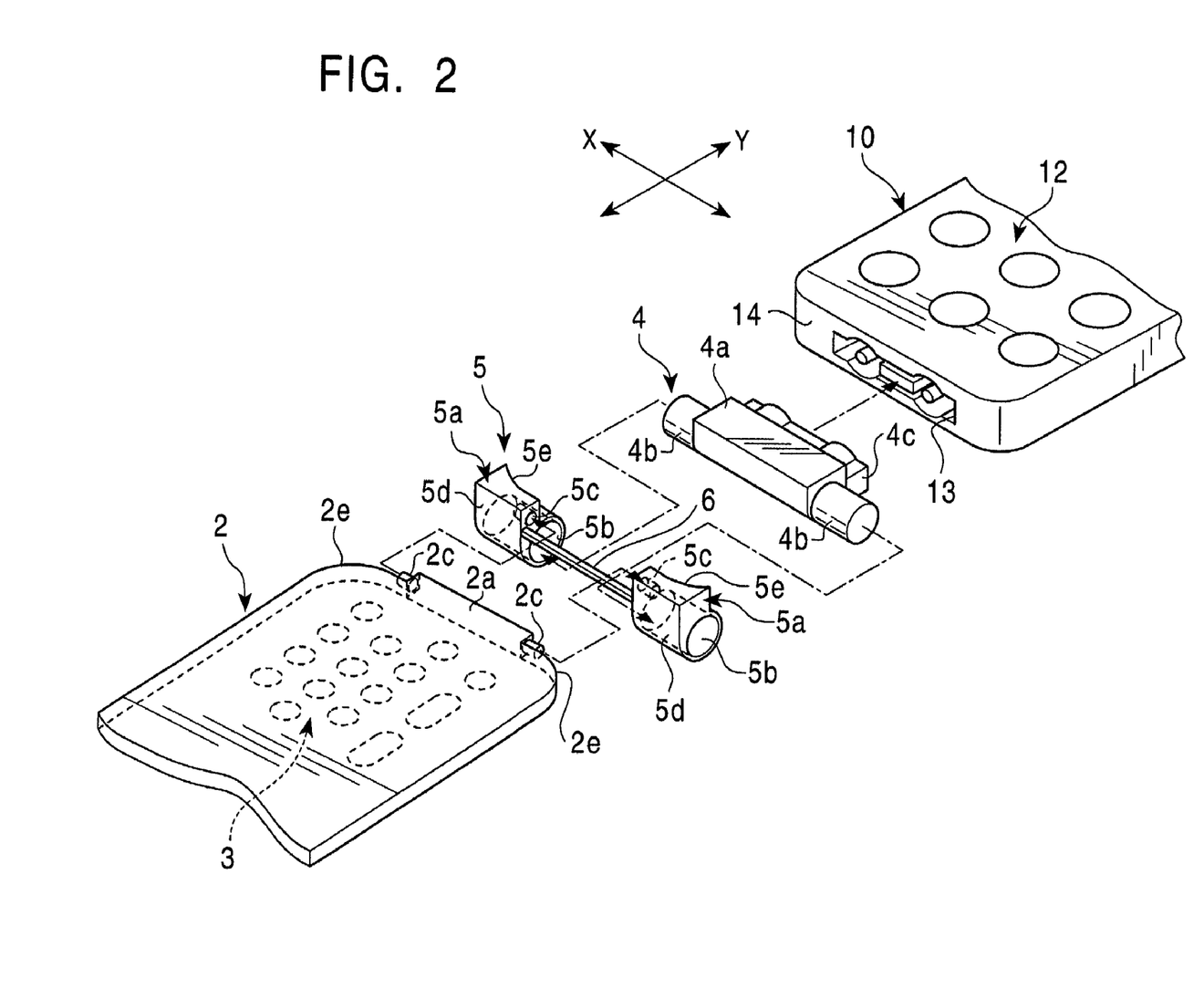
FIG. 2 is an exploded perspective view of the input device.

FIG. 1 is a plan view of an input device according to a first embodiment of the present invention in a state in which the input device is used, and FIG. 2 is an exploded perspective view of the input device. In addition, FIG. 3 is a sectional view of an operating unit of the input device, and FIG. 4 is a diagram showing the manner in which the position of the input device is changed.

With reference to FIG. 1, an input device 1 is connected to a mobile phone (mobile terminal) 10, and is used while being disposed on an input unit 12, which is provided at the front side of the mobile phone 10 and which includes a plurality of operation keys. In addition to the input unit 12, a display unit 11 including a liquid crystal panel is also provided on a housing of the mobile phone 10 at the front side thereof, and a connecting port 13 (see FIG. 2), to which the input device 1 is connected, is provided at the bottom surface 14 of the mobile phone 10. Although mobile phones of the folder-type will be described in the following embodiments as examples, the input device of the present invention may also be attached to mobile phones other than the folder-type.

The input device 1 includes a keyboard-type operating unit 2, and the operating unit 2 includes an operating surface 3, on which a plurality of operation keys is arranged, at the front side thereof. As shown in FIG. 1, for example, ten number keys 3a, twenty-six alphabet keys 3b, two symbol keys 3c, eight special keys 3d, and one cursor-control key 3e are arranged with predetermined gaps therebetween.

Figure 3:
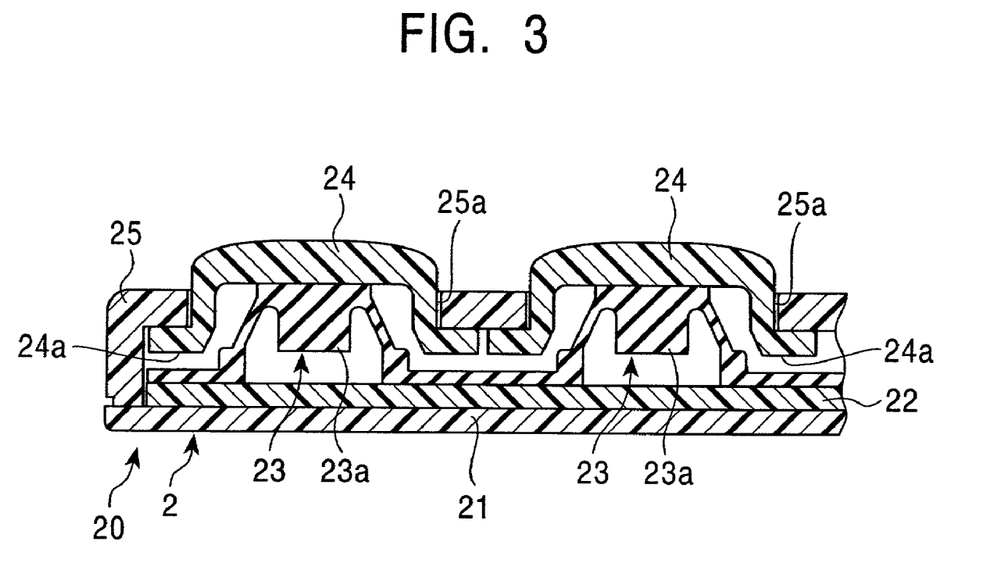
FIG. 3 is a sectional view of an operating unit of the input device.
Figure 4:
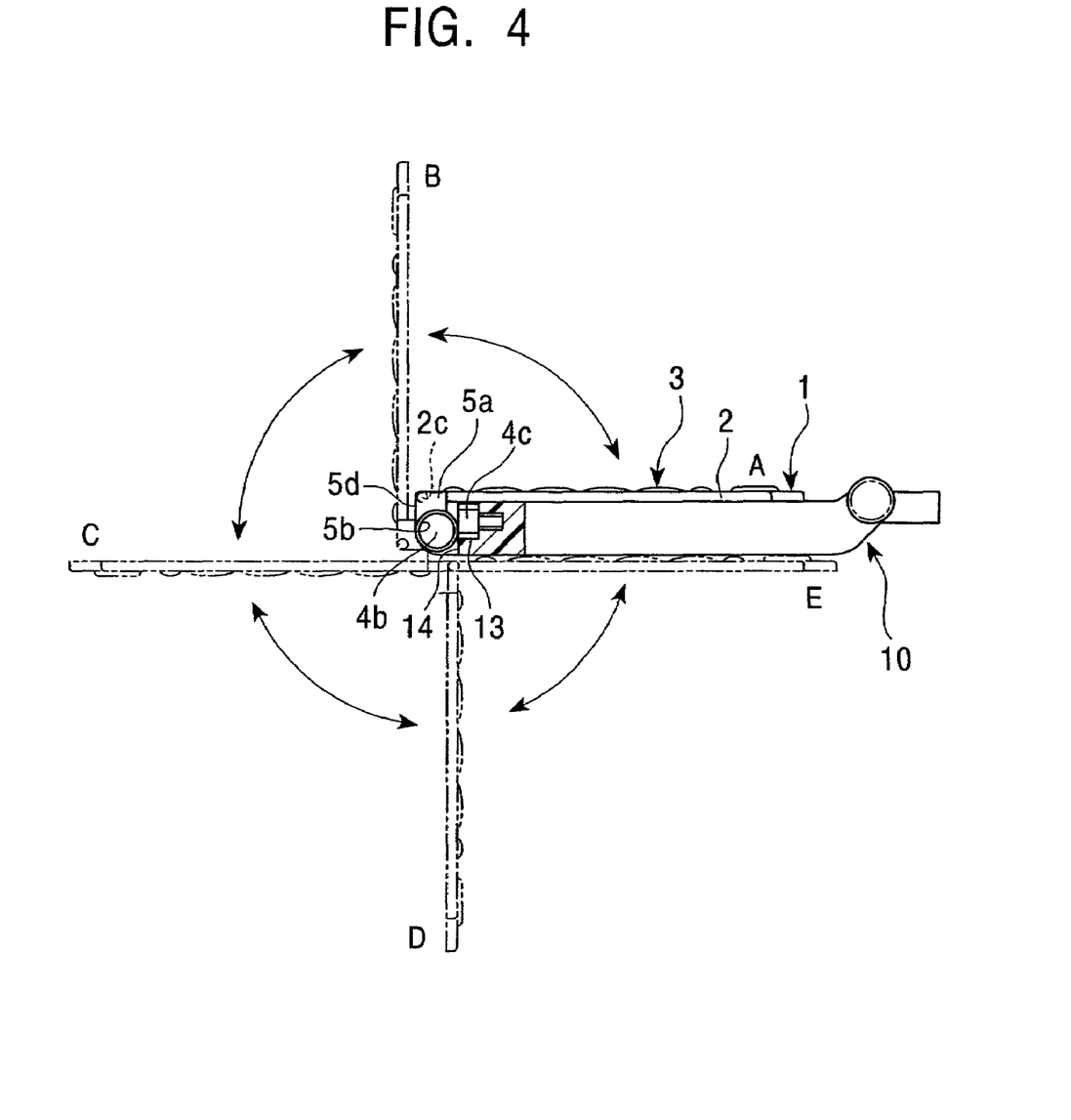
FIG. 4 is a diagram showing a manner in which the position of the input device is changed.

As shown in FIG. 3, the operating unit 2 includes a thin housing 20. The housing 20 is constructed of a base 21, which is formed of a synthetic resin and which is placed at the bottom side of the housing 20, and a cover 25 which covers the surface of the base 21.

A film-shaped substrate 22, which is provided with a wiring pattern on the top surface thereof, is laminated on the base 21. Although not shown in the figure, the film-shaped substrate 22 may be formed in, for example, a three-layer structure. In the film-shaped substrate 22 having a three-layer structure, a top-layer film and a bottom-layer film are laminated together with a spacer film therebetween. The top-layer film and the bottom-layer film are provided with connecting points at positions such that the connecting points oppose each other, and the spacer film is provided with holes at positions corresponding to the connecting points. An elastic pressing member 23, which is formed of rubber and which is provided with hollow portions, is disposed on the film-shaped substrate 22 in such a manner that the hollow portions are placed at positions corresponding to the connecting points of the film-shaped substrate 22. Alternatively, a metal contact formed of, for example, a leaf spring, may also be used as the elastic pressing member 23. A pushing projection 23a is formed at the upper side in each of the hollow portions of the elastic pressing member 23, and keytops 24 formed of resin, rubber, etc., are disposed on the elastic pressing member 23. The cover 25 is placed in such a manner that the keytops 24 are inserted through holes 25a formed in the cover 25 and the top surfaces of the keytops 24 project from the cover 25. The keytops 24 are provided with flange portions 24a which are integrally formed with the keytops 24, so that the keytops 24 cannot escape from the cover 25.

The film-shaped substrate 22 may also have a single-layer structure instead of the above-described three-layer substrate. In such a case, a substrate formed of paper phenol, glass epoxy, etc., on which contacting points and a circuit pattern are formed may be used, and a rubber member (rubber spring) having contacting points may be disposed on the substrate.

In the above-described operating unit 2, when one of the keytops 24 is pressed by a finger, the elastic pressing member 23 is bent. Accordingly, the contacting points of the top film and the bottom film come into contact with each other, and an operation signal including character information, etc., is generated. Then, when the pressing force applied to the keytop 24 is removed, the keytop 24 returns to its initial position by the restoring force applied by the elastic pressing member 23.

The cursor control key 3e shown in FIG. 1 is formed of a button-shaped operating portion which is supported in such a manner that the button-shaped operating portion can be tilted in the X and Y directions and in directions therebetween. When the operating portion is pushed and tilted in a desired direction, a cursor (pointer) shown on the display unit 11 moves in a direction corresponding to the direction in which the operating portion is tilted. Alternatively, an item selected from a menu (graphs, characters, etc.) shown on the display unit 11 can be changed. When a decision operation is performed after the desired item is selected, a function corresponding to the selected item is performed.

In the input device 1 according to the present embodiment, the width (the size in the X direction) of the operating unit 2 is made the same as or slightly smaller than the external width of the mobile phone 10. Accordingly, the operating unit 2 does not project from the right and left sides of the mobile phone 10. In addition, in the input device 1, the length of the operating unit 2 in the Y direction is set such that the operating unit 2 does not reach a hinge portion 10a of the mobile phone 10, so that the operating unit 2 can be closely attached to the input portion 12 of the mobile phone 10.

As shown in FIG. 2, the input device 1 includes the above-described operating unit 2, a supporting unit 4, and a rotating unit 5.

The supporting unit 4 includes a supporter 4a, and first shafts 4b and 4b, which are parallel to the bottom surface 14 of the mobile phone 10, project from the supporter 4a at both ends thereof. In addition, a connector 4c is provided on the side surface of the supporter 4a. The length of the first shafts 4b and 4b is determined such that the first shafts 4b and 4b do not project from the right and left sides of the mobile phone 10.

The connector 4c of the supporting unit 4 is fitted into the connecting port 13 formed in the bottom surface 14 of the mobile phone 10. The connector 4c may be constructed such that it can be exchanged with another connector in accordance with the shape of the connecting port 13.

The rotating unit 5 includes a pair of rotators 5a and 5a, which are connected to each other with a connecting member 6 in such a manner that the rotators 5a and 5a oppose each other. The connecting member 6 connects the rotators 5a and 5a at front ends thereof in the state shown in FIG. 2.

First bores 5b and 5b, which extend in the X direction, are formed in the rotators 5a and 5a, and the inside diameter of the first bores 5b and 5b are made approximately the same as the outside diameter of the first shafts 4b and 4b. Accordingly, the rotating unit 5 is supported by the first shafts 4b and 4b in a rotatable manner.

A base end portion 2a of the operating unit 2 is provided with second shafts 2c and 2c, which project in the width direction (in the X direction) parallel to the first shafts 4b and 4b. In addition, second bores 5c and 5c, which extend parallel to the second shafts 2c and 2c, are formed in the side surfaces of the rotators 5a and 5a which oppose each other at positions close to the above-described first bores 5b and 5b. The outside diameter of the second shafts 2c and 2c is made approximately the same as the inside diameter of the second bores 5c and 5c, so that the operating unit 2 is supported by the second shafts 2c and 2c in a rotatable manner.

In the input device 1 which is constructed as described above, a position conversion unit is formed between the operating unit 2 and the supporting unit 4.

Next, the manner in which the position of the input device 1 is changed will be described below with reference to FIG. 4. In FIG. 4, the position A shown by the solid lines is an operating position in which the input device 1 is operated and the position E shown by the double-dotted chain lines is a stored position in which the input device 1 is stored.

At the position A, the second shafts 2c and 2c are placed at the front side of the mobile phone 10 so that the operating unit 2 can be disposed close to the input unit 12, which is provided at the front side of the mobile phone 10, in such a manner that the operating surface 3 of the operating unit 2 is exposed. When the operation keys 3a to 3e are operated while the input device 1 is at this position, operation signals are generated and transmitted to the mobile phone 10, and character strings corresponding to the input operation are shown on the display unit 11. The character strings shown on the display unit 11 may be, for example, hiragana, katakana, kanfi (Chinese characters), Roman alphabet characters, numbers, symbols, pictorial symbols, or combinations thereof.

As shown in FIG. 2, corners at the base end of the operating unit 2 are formed as curved portions 2e and 2e, and the rotators 5a and 5a are provided with curved portions 5e and 5e at the end surfaces facing the bottom surface 14 of the mobile phone 10. The curved portions 5e and 5e have the same curvature as that of the curved portions 2e and 2e. Accordingly, when the input device 1 is at the position A shown in FIG. 4, the curved portions 2e and 2e are fitted into the curved portions 5e and 5e while the operating unit 2 is closely attached to the surface of the mobile phone 10.

When the operating unit 2 is not used, it is lifted up from the position A, and is rotated in the counterclockwise direction in FIG. 4. Thus, the rotating unit 5 supported by the first shafts 4b and 4b is also rotated and the second shafts 2c and 2c are moved toward the bottom surface 14 of the mobile phone 10. Accordingly, the operating unit 2 is moved to the position B.

Then, when the operating unit 2 is further rotated in the counterclockwise direction from the position B, the rotating unit 5 supported by the first shafts 4b and 4b is further rotated and the second shafts 2c and 2c are moved to the back side of the operating unit 2. Thus, the operating unit 2 is moved to the position C, where the operating unit 2 extends horizontally. Since front sides 5d and 5d of the rotators 5a and 5a come into contact with the bottom surface 14 of the mobile phone 10 at this position, the rotating unit 5 does not rotate further in the counterclockwise direction from this position.

When the operating unit 2 is further rotated in the counterclockwise direction from the position C, the operating unit 2 moves to the position D and becomes perpendicular to the back surface of the mobile phone 10, while the positions of the second shafts 2c and 2c do not change. Then, when the operating unit 2 is further rotated in the counterclockwise direction, operating unit 2 is moved to the position E where the operating unit 2 is stored such that the operating unit 2 is disposed close to the back surface of the mobile phone 10. At this position, the operating surface 3 of the operating unit 2 is in contact with the back surface of the mobile phone 10. In addition, both edges of the operating unit 2 in the X direction do not project from the mobile phone 10, so that the operating unit 2 cannot be seen from the front side of the mobile phone 10 except for the supporting unit 4 and the rotating unit 5. Accordingly, the mobile phone 10 can be handled without causing discomfort to the user.

Although not shown in the figure, the position conversion unit including the supporting unit 4 of the input device 1 preferably includes a switching member which allows the input unit 12 of the mobile phone 10 to be operated when the operating unit 2 is at the stored position and allows the keys of the operating unit 2 to be operated when the operating unit 2 is at the operating position. A circuit for transmitting the operation signals from the operating unit 2 to the mobile phone 10 may be constructed such that the operation signals are transmitted through the second shaft 2c, the second bore 5c, the first bore 5b, and the first shaft 4b. Accordingly, the operation signals generated in the operating unit 2 can be transmitted to the connecting port 13. Alternatively, the operations signals may be transmitted by connecting a flexible substrate on which a wiring pattern is printed to the supporting unit 4 and the operating unit 2.

In addition, an engaging unit may be provided for preventing the operating unit 2 from being moved away from the front surface of the mobile phone 10 when the operating unit 2 is at the operating position and from the back surface of the mobile phone 10 when the operating unit is at the stored position.

Figure 5:
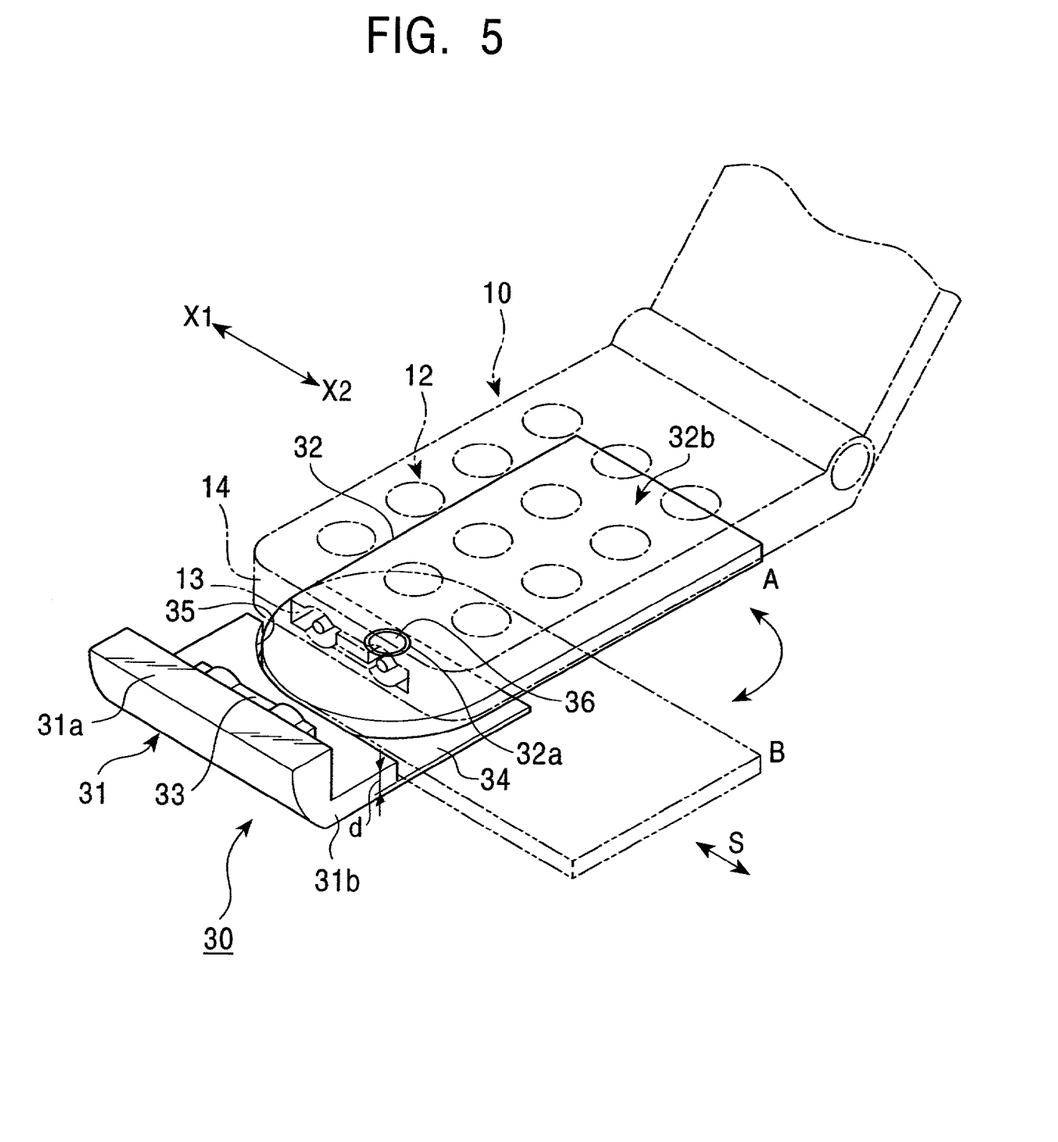
FIG. 5 is a perspective view showing an input device according to a second embodiment of the present invention.

FIG. 5 is a perspective view of an input device according to a second embodiment of the present invention.

With reference to FIG. 5, an input device 30 includes a supporting unit 31 and an operating unit 32. The supporting unit 31 is formed in the letter 'L' shape, and includes a side plate 31a which opposes the bottom surface 14 of the mobile phone 10 and a bottom plate 31b which opposes the back surface of the mobile phone 10. The width of the supporting unit 31 in the X1–X2 direction is made approximately the same as the width of the mobile phone 10. In addition, the bottom plate 31b is provided with a step portion 34 having a size corresponding to the thickness (d) of the operating unit 32, and the side surface of the step portion 34 is formed as a curved portion 35 at a position close to the end thereof in the X1 direction.

In the supporting unit 31, the step portion 34 is provided with a shaft 36, which extends perpendicular to the back surface of the mobile phone 10, on the bottom surface thereof. In addition, the supporting unit 31 is provided with a connector 33 which projects from the supporting unit 31 at the surface facing the bottom surface 14 of the mobile phone 10.

The operating unit 32 is constructed such that one end thereof in the longitudinal direction is formed in a semicircular shape having the same curvature as that of the above-described curved portion 35. In addition, a bore 32a, which is parallel to the shaft 36, is formed at the center of the semicircle.

As shown in FIG. 5, the shaft 36 is inserted in the bore 32a formed in the operating unit 32, so that the operating unit 32 is supported in a rotatable manner.

In the input device 30 which is formed as described above, the operating unit 32 is able to rotate between a stored position shown by the solid lines (position A) and an operating position shown by the double-dotted chain lines (position B). In the stored position, the operating unit 32 is closely attached to the back surface of the mobile phone 10. When the operating unit 32 is used, it is rotated around the shaft 36 to the operating position so that an operating surface 32b of the operating unit 32 is exposed at the side of the mobile phone 10. In this case, a mechanism for straightly sliding the operating unit 32 from the above-described operating position toward the side (in the S direction) may be provided so that the area of the operating surface 32b which is exposed at the side of the mobile phone 10 can be increased.

The above-described input device 30 preferably includes a switching member which allows the input unit 12 of the mobile phone 10 to be operated when the operating unit 32 is at the stored position and allows the keys of the operating surface 32b of the operating unit 32 to be operated when the operating unit 32 is at the operating position. In the second embodiment, a circuit for transmitting the operation signals between the operating unit 32 and the mobile phone 10 may be constructed such that the operation signals are transmitted via the shaft 36.

Similar to the above-described input device 10, in the input device 30 shown in FIG. 5, both edges of the operating unit 32 do not project from the mobile phone 10 when the operating unit 32 is at the stored position (except for the connecting portion). Accordingly, the mobile phone 10 can be handled without causing discomfort to the user.

Although cases in which the input devices are attached to a mobile phone are explained in the above-described embodiments, the present invention is not limited to this. The input device of the present invention may also be attached to, for example, PDAs. In such a case, the operating unit may be constructed such that it is extracted from the side-edge of the mobile terminal as shown in FIG. 5.

In addition, although the input devices of the above-described embodiments are constructed such that they can be connected and disconnected to/from the mobile terminal, the present invention is not limited to this. The input device of the present invention may also be installed in a mobile terminal in advance. For example, an opening may be formed in a side surface of a mobile terminal, and the operating unit may be installed in such a manner that the operating unit is able to project from inside the mobile terminal via the opening.

In addition, when the input device 1 is at the operating position as shown in FIG. 1, the orientation of the character strings shown on the display unit 11 may be changed to a landscape orientation so as to comply with the orientation of the operating surface 3 of the operating unit 2 by a software process performed in the mobile phone 10.

What is claimed is:

1. An input device comprising:
   a supporting unit including a connector which is detachably connected to a mobile terminal having a display unit, the supporting unit further having a supporter and first shafts, which project from the supporter at opposing ends, the connector provided on a side surface of the supporter;
   an operating unit which transmits an operation signal to the mobile terminal via the connector;
   a plurality of operation keys provided on an operating surface of the operating unit;
   a position conversion unit which is formed between the supporting unit and the operating unit, and which, while the connector is connected to the mobile terminal, allows the operating unit to rotate between a stored position at which the operating unit is hidden behind the mobile terminal and an operating position at which the operating surface is exposed at a position such that the operating surface can be operated; and
   a rotating unit that includes a pair of opposing rotators, which are connected to each other with a connecting member,
   wherein the rotators contain first bores, and the first shafts are retained in the first bores.

2. An input device according to claim 1, wherein, when the operating unit is at the operating position, the operating unit is disposed on a front surface of the mobile terminal such that the operating surface faces upward.

3. An input device according to claim 2, wherein an input unit is provided on the front surface of the mobile terminal in addition to the display unit and the operating unit is disposed on the input unit when the operating unit is at the operating position, and
   wherein the input unit of the mobile terminal is operable when the operating unit is at the stored position and the operation keys of the operating unit are operable when the operating unit is at the operating position.

4. An input device according to claim 2, wherein the connecter is connected to a connecting port provided at a bottom-end surface of the mobile terminal,
   wherein the position conversion unit includes the rotating unit, the first shafts extending parallel to the bottom-end surface, and the operating unit is supported by second shafts in a rotatable manner at a base end portion of the operating unit, the second shafts extending parallel to the first shafts, and
   wherein, when the rotating unit is rotated in one direction, the second shafts are moved to a front side of the mobile terminal and the operating unit is moved to the operating position at which the operating unit is disposed close to the front surface of the mobile terminal, and when the rotating unit is rotated in an opposing direction, the second shafts are moved to a back side of the mobile terminal and the operating unit is moved to the stored position at which the operating unit is disposed close to a back surface of the mobile terminal.

5. An input device according to claim 4, wherein a diameter of the second shafts is substantially smaller than a diameter of the first shafts.

6. An input device according to claim 1, wherein all inputs of an input unit provided on a front surface of the mobile terminal are covered by the operating unit when the operating unit is at the operating position.

7. An input device according to claim 1, wherein no inputs of an input unit provided on a front surface of the mobile terminal are covered by the operating unit when the operating unit is at the stored position.

8. An input device according to claim 1, wherein the position conversion unit comprises a switching member which switches between allowing an input unit of the mobile terminal to be operated when the operating unit is at the stored position and allowing the operating keys of the operating unit to be operated when the operating unit is at the operating position.

9. An input device according to claim 1, wherein the supporting unit is connected to a bottom of the mobile terminal and the position conversion unit is about the same width as the bottom of the mobile terminal.

10. An input device according to claim 1, wherein the supporting unit is connected to a bottom of the mobile terminal and the operating unit is about the same length as an input unit provided on a front surface of the mobile terminal.

11. An input device according to claim 1, wherein the display unit is not covered by the operating unit when the operating unit is at the operating position.

12. An input device according to claim 1, wherein corners of the operating unit have curved portions and the rotators have curved regions with the same curvature as that of the curved portions such that the curved portions fit into the curved regions.

13. An input device according to claim 1, wherein the operating unit comprises a base end portion having second shafts, the rotators contain second bores that retain the second shafts.

14. An input device according to claim 13, wherein as the operating unit rotates from the operating position to the stored position, the rotating unit rotates and the second shafts are moved toward a bottom surface of the mobile terminal then to a back side of the operating unit.

15. An input device according to claim 14, wherein the rotators contain front sides that come into contact with the bottom surface of the mobile terminal when the operating unit is at an intermediate position between the operating position and the stored position, thereby stopping rotation of the rotating unit.

16. An input device according to claim 15, wherein the operating unit continues to rotate from the intermediate position to the stored position without rotation of the rotating unit.

17. An input device according to claim 1, wherein the operating keys are not operable in the stored position.

18. An input device comprising:
 a mobile terminal having a front surface on which a display unit and an input unit are disposed;
 a supporting unit including a connector which is detachably connected to the mobile terminal, a supporter and first shafts, which project from the supporter at opposing ends, the connector extending from a side surface of the supporter;
 an operating unit which transmits an operation signal to the mobile terminal via the connector, the operating unit having an operating surface with a plurality of operation keys disposed thereon; and
 a rotating unit which allows the operating unit to rotate between a stored position in which the operating unit is adjacent to a back surface of the mobile terminal and an operating position, the rotating unit including a pair of opposing rotators, which are connected to each other with a connecting member, and the rotators containing first bores in which the first shafts are retained.

19. An input device according to claim 18, wherein all inputs of the input unit are covered by the operating unit when the operating unit is at the operating position.

20. An input device according to claim 18, wherein no inputs of the input unit are covered by the operating unit when the operating unit is at a stored position.

21. An input device according to claim 18, wherein the display unit is not covered by the operating unit when the operating unit is at the operating position.

22. An input device according to claim 18, wherein corners of the operating unit have curved portions and the rotators have curved regions with the same curvature as that of the curved portions such that the curved portions fit into the curved regions.

23. An input device according to claim 18, wherein the operating unit comprises a base end portion having second shafts, the rotators contain second bores that retain the second shafts.

24. An input device according to claim 23, wherein as the operating unit rotates from the operating position to a stored position, the rotating unit rotates and the second shafts are moved toward a bottom surface of the mobile terminal then to a back side of the operating unit.

25. An input device according to claim 24, wherein the rotators contain front sides that come into contact with the bottom surface of the mobile terminal when the operating unit is in an intermediate position between the operating position and the stored position, thereby stopping rotation of the rotating unit.

26. An input device according to claim 25, wherein the operating unit continues to rotate from the intermediate position to the stored position without rotation of the rotating unit.

27. An input device according to claim 18, wherein, in the operating position, the operating surface is adjacent to the front surface.

28. An input device according to claim 18, wherein the operating keys are not operable in the stored position.

29. An input device according to claim 18, wherein the operating unit is substantially the same size as the mobile terminal at the operating position and at the stored position.

30. An input device according to claim 29, wherein the operating unit is substantially the same size as the mobile terminal at all positions between the operating position and the stored position.

31. An input device comprising:
 a mobile terminal having a front surface on which a display unit and an input unit are disposed;
 an L-shaped supporting unit including a connector which is detachably connected to the mobile terminal, a side plate which opposes a bottom surface of the mobile terminal and a bottom plate which opposes the back surface of the mobile terminal;
 an operating unit which transmits an operation signal to the mobile terminal via the connector, the operating unit having an operating surface with a plurality of operation keys disposed thereon; and a rotating unit which allows the operating unit to rotate between a stored position in which the operating unit is adjacent to a back surface of the mobile terminal and an operating position in a rotating plane, wherein the rotating plane is parallel to the back surface of the mobile terminal.

32. An input device according to claim 31, wherein, in the operating position, the operating surface is adjacent to and forms an L shape with the back surface.

33. An input device according to claim 32, wherein, in a stored position, the operating surface is substantially parallel with the back surface.

34. An input device according to claim 31, wherein the bottom plate has a step portion having a thickness substantially the same as that of the operating unit.

35. An input device according to claim 34, wherein the step portion has a curved side surface, the operating unit has a curved portion, and the curved portion of the operating unit fits into the curved side surface of the step portion.

36. An input device according to claim 35, wherein the step portion has a flat side surface that extends from the curved side surface and the operating unit has a flat portion that corresponds to the flat side surface of the step portion.

37. An input device according to claim 34, wherein the step portion has a shaft that extends perpendicular to the back surface of the mobile terminal, thereby forming the rotating unit.

38. An input device according to claim 37, wherein edges of the operating unit do not project from the mobile terminal when the operating unit is at a stored position.

39. An input device according to claim 31, wherein the operating keys are not operable in the stored position.

* * * * *